Feb. 3, 1931.  J. MILLEN  1,790,939
ILLUMINATED DIAL
Filed Dec. 4, 1929
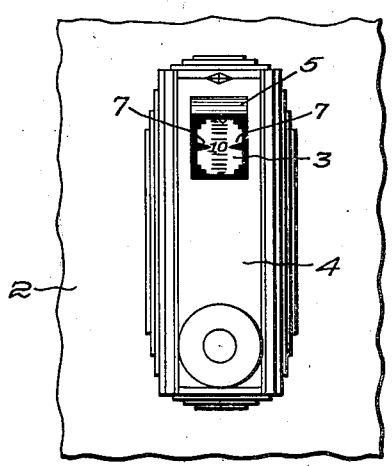
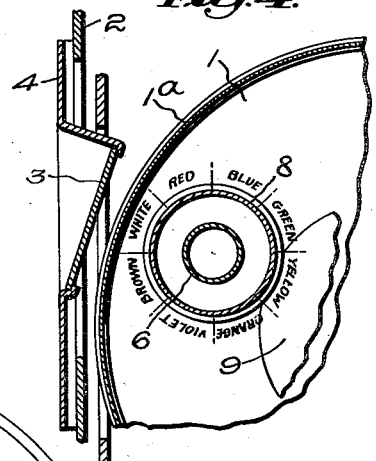
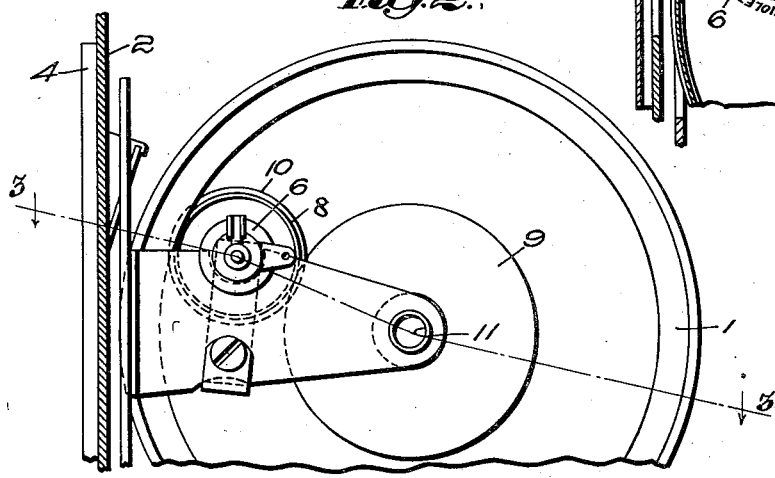
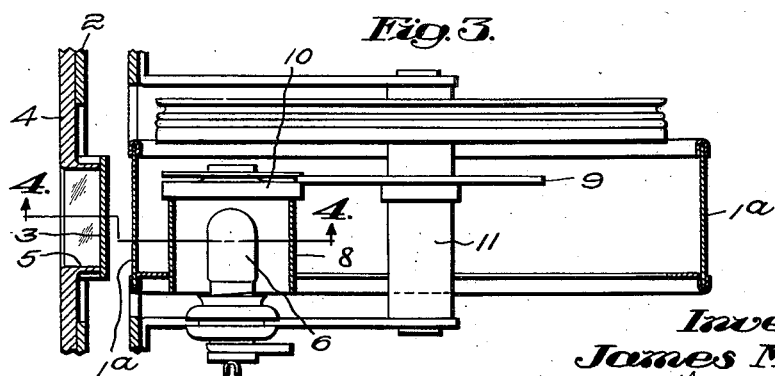
Inventor:
James Millen
by Emery, Booth, Varney + Townsend
Attys Patented Feb. 3, 1931

1,790,939

UNITED STATES PATENT OFFICE

JAMES MILLEN, OF MALDEN, MASSACHUSETTS

ILLUMINATED DIAL

Application filed December 4, 1929. Serial No. 411,512.

My invention aims to provide improvements in illuminated dials for radio and like apparatus.

In the drawings which illustrate a preferred embodiment of my invention:—

Figure 1 is a front elevation of a dial installation showing the markings as they appear when the dial is illuminated;

Fig. 2 is an enlarged partial side elevation of the dial installation shown in Figure 1;

Fig. 3 is a part section and part elevation taken on the line 3—3 of Fig. 2; and Fig. 4 is a section taken on the line 4—4 of Fig. 3.

Referring to the embodiment of my invention illustrated by the drawings, I have shown a so-called drum type dial which is substantially the same in construction and operation as the device illustrated and described in the application of William A. Ready, Serial No. 281,561, filed May 29, 1928. Therefore, I shall refer only to that much of the detail structure of the dial as shall be necessary for a complete understanding of my invention. At the outset I wish to have it understood that my invention is adapted to be used with various other types of dials which may be quite different in structure from the one I have selected for purposes of illustration. My invention is particularly adapted for use with radio instruments with which a scale is used for movement in back of a part having an opening through which a portion of the scale is usually viewed.

In the drawings I have shown a rotatable drum 1 mounted in back of the panel 2 of a radio set and having a scale 1ª which is movable in back of a screen 3 mounted on a plate 4 secured to the front face of the panel 2. The screen 3 is preferably of translucent material capable of receiving an image and mounted to intersect an opening 5 in the plate 4, as shown in Figs. 1 and 3.

A lamp 6 is provided for illumination of the scale so that the lines and figures of the scale may be projected in any suitable manner to the screen 3 where they may be viewed from the front of the radio set, as shown in Fig. 1.

While I am aware that there are several different ways of projecting the images of the lines and figures of the scale 1ª to the screen 3, I shall describe a simple and efficient means for accomplishing the same.

In the drawings the lamp 6 is mounted for illumination of the inside of the drum so that the rays of light may pass through translucent or transparent portions of the scale 1ª and cast an image on the screen. For this purpose the figures and lines on the scale 1ª may be transparent or translucent and the remainder of the scale opaque or vice versa, as desired. With this arrangement of parts the screen 3 is flat and the scale 1ª is curved so that the markings of the scale are cast upon the screen in such a manner that they appear in a flat plane (Fig. 1) but diminish in size and in clarity each side of the center or point of shortest distance between the face of the scale and the plane of the screen. Any other curvature arrangement of the parts may be used to effect the relative magnitude of the images.

The screen 3 is marked with pointers 7 (Fig. 1), or other suitable means, at the point where the images are clearest and largest, so that the images appear in the same plane as the pointers 7. This arrangement eliminates parallax, because no matter what angle the observer views the screen the clearest image appears between the pointers.

Another novel feature of my invention resides in the use of a color or color means with the projected images. In this connection, I wish to have it understood that the color effect may be readily secured in many ways, and a single color may be used or a number of colors. The color or colors may be applied to the screen, the scale, the lamp, or, as shown in the drawings, by the use of a separate screen which rotates about the device. A series of color effects may be projected to the screen or a kaleidoscopic effect may be secured, depending upon the arrangement of the colors and the means for producing the effects.

The color device used with the drum type dial, illustrated by the drawings, comprises a rotary color screen 8 mounted for rotation about the lamp 6 (Fig. 3) and driven by means of friction discs 9 and 10 secured to the color screen 8 and the shaft 11 of the dial device. Thus, when the dial is rotated, the color screen 8 will rotate to present different areas of color between the lamp 6 and the screen 3. Any other suitable means may be used in place of the discs 9 and 10.

My invention is a decided improvement over the illuminated dials heretofore in use, because the reading of a given setting, for the device to which the dial is attached, can be more easily and more accurately determined due to the fact that parallax is entirely eliminated. With my illuminated dial using the screen 3 the images of the lines and numerals pass by the screen in a flat plane and appear sharper and larger at a point opposite the pointers. In the type of device now in general use the pointers are spaced substantial distances from the face of the scale and, therefore, the observer must be careful of the angle at which he views the points with relation to the scale or an accurate setting cannot be effected. The use of the screen is a simple and efficient means of overcoming this objection. Furthermore, the lines and numerals, on the devices now in use, are presented on a curved surface and without any apparent variation as to clearness.

The color effect which I produce at the screen is pleasing and may be arranged in such a manner that the observer may know, by the color, the ratio of wave bands to which the instrument is set.

While I have illustrated and described a preferred embodiment of my invention, I do not wish to be limited thereby, because the scope of my invention is best defined by the following claims.

Claims:

1. A radio dial mechanism comprising, in combination, a fixed translucent screen, a rotary type dial carrying a scale having markings thereon for indicating the rotation of a part to which the dial may be connected, a lamp located behind the dial for illuminating the scale and thereby to project the markings in varying intensity and clearness on to the said screen as the dial is rotated so that they may be read at the front side of the screen, and color means for coloring the markings projected to the screen whereby the markings may appear at a desired color.

2. A dial mechanism comprising, in combination, a rotary drum type dial having a curved scale marked to indicate the rotation of the dial, a fixed flat translucent screen located at right angles to a radial line from the center of the drum type dial, a lamp located within the drum type dial to illuminate the scale whereby the markings on the curved scale are projected to the screen in an uneven relative magnitude because of the scale being curved relative to the screen thereby to present the markings sharply at a given point on the screen and diffused over the remainder of the screen, and an annular rotary color screen surrounding the lamp and connected for rotation with the drum type dial, said color screen being composed of various colors whereby the illuminated markings projected upon the translucent screen may be presented in a series of colors as the dial is rotated.

3. A dial mechanism comprising, in combination, a movable scale to indicate the degree of rotation of the device to which the scale is connected, a translucent screen fixed with relation to said scale, light means associated with the dial mechanism for projecting images of the markings on the scale to the translucent screen so that the images may be observed from the front side of the said screen, a rotary color device mounted for rotation about the axis of the light means and having a series of colors movable successively between the light means and the scale, and means operable to synchronize the movement of the rotary color device with the scale.

4. A radio dial mechanism comprising, in combination, a fixed translucent screen, a drum type dial carrying a scale having markings thereon for indicating the rotation of a part to which the drum type dial may be connected, a lamp located within the drum type dial for illuminating the scale and thereby to project the markings on to the said screen as the drum is rotated so that they may be read at the front side of the screen, a rotary color screen mounted for rotation about the said lamp, said color screen being divided into sections of various colors, and driving means connecting the rotary color screen with the drum type dial.

In testimony whereof, I have signed my name to this specification.

JAMES MILLEN.